US012643158B2

(12) United States Patent　　　　(10) Patent No.:　US 12,643,158 B2

Sjolander et al.　　　　　　　　　　(45) Date of Patent:　　　Jun. 2, 2026

(54) GRINDING TOOL FOR GRINDING BUTTONS ON A ROCK DRILL BIT

(71) Applicant: C.M.E. BLASTING & MINING EQUIPMENT LTD., Oakville (CA)

(72) Inventors: Bo Thomas Sjolander, Oakville (CA); Bjorn Sjolander, Oakville (CA)

(73) Assignee: C.M.E. Blasting & Mining Equipment Ltd., Oakville (CA)

( * ) Notice: Subject to any disclaimer, the term of this patent is extended or adjusted under 35 U.S.C. 154(b) by 698 days.

(21) Appl. No.: 17/621,246

(22) PCT Filed: Jun. 25, 2020

(86) PCT No.: PCT/CA2020/000091

§ 371 (c)(1),
(2) Date: Dec. 21, 2021

(87) PCT Pub. No.: WO2020/257918

PCT Pub. Date: Dec. 30, 2020

(65) Prior Publication Data

US 2022/0362861 A1　　　Nov. 17, 2022

(30) Foreign Application Priority Data

Jun. 25, 2019　(CA) ................................ CA 3048076

(51) Int. Cl.
*B23B 31/117*　　　(2006.01)
*B24B 3/33*　　　　(2006.01)
(Continued)

(52) U.S. Cl.
CPC ............ *B23B 31/1175* (2013.01); *B24B 3/33* (2013.01); *B24B 41/04* (2013.01); *B24B 51/00* (2013.01)

(58) Field of Classification Search
CPC ........... B24B 3/33; B24B 45/00; B24B 27/04; B23B 31/1175; B24D 7/005; B24D 7/18; B24D 7/10
(Continued)

(56) References Cited

U.S. PATENT DOCUMENTS 5,527,206　A　　6/1996　Sjolander
6,835,114　B2　12/2004　Sjolander
(Continued)

FOREIGN PATENT DOCUMENTS

CA　　　2694705　A1　*　9/2010
CA　　　2870784　A1　　5/2016
(Continued)

OTHER PUBLICATIONS

"Extended European Search Report Issued in Corresponding European Patent Application No. 20831725.5", Mailed Date: Jun. 23, 2023, 9 pages.

*Primary Examiner* — Monica S Carter
*Assistant Examiner* — Sarah Akyaa Fordjour
(74) *Attorney, Agent, or Firm* — Volpe Koenig

(57)　　　　　ABSTRACT

A grinding cup for detachable connection to an output drive shaft of a grinding machine for grinding buttons on drill bits or cutters. The grinding cup has top and bottom surfaces, a lower grinding section, and an upper body section co-axial with the lower grinding section to form the grinding cup with a centrally disposed recess formed in the bottom surface of the lower grinding section. The upper body section has an upper base having a centrally disposed upright support section having a first support section extending from the top surface of the upper base. The co-axial drive component has a lower cam portion, an upper portion coaxial with the lower cam portion, and retaining member (Continued)

for detachably connecting the grinding cup to the output drive shaft of the grinding machine.

15 Claims, 10 Drawing Sheets

(51) Int. Cl.
  *B24B 41/04*        (2006.01)
  *B24B 51/00*        (2006.01)
(58) Field of Classification Search
  USPC ........................................ 451/177, 342, 344
  See application file for complete search history.

(56)                References Cited

U.S. PATENT DOCUMENTS 7,402,093  B2      7/2008  Sjolander et al.
7,510,466  B1 *    3/2009  Norman ................... B24D 7/16
                                                      451/911
2003/0153256  A1 *   8/2003  Sjolander ............... B24B 45/00
                                                      451/541
2004/0077298  A1      4/2004  Sjolander
2008/0207102  A1 *   8/2008  Sjolander ............... B24B 45/00
                                                      451/548
2012/0007748  A1      1/2012  Forgues et al.
2017/0304983  A1 *  10/2017  Sjolander .................. B24B 3/33
2020/0030938  A1 *   1/2020  Knudson ................. B24B 49/14

FOREIGN PATENT DOCUMENTS

EP          2529887  A2   12/2012
WO          9623627  A1    8/1996
WO         03043782  A1    5/2003
WO      2018160658  A2    9/2018

* cited by examiner

GRINDING TOOL FOR GRINDING BUTTONS ON A ROCK DRILL BIT

BACKGROUND

The present disclosure relates to improvements in apparatus for grinding the hard metal inserts or working tips of rock drill bits (percussive or rotary), tunnel boring machine cutters (TBM) and raised bore machine cutters (RBM) and more specifically, but not exclusively, for grinding the cutting teeth or buttons of a rock drill bit or cutter.

In drilling operations the cutting teeth (buttons) on the drill bits or cutters become flattened (worn) after continued use. Regular maintenance of the drill bit or cutter by regrinding (sharpening) the buttons to restore them to substantially their original profile enhances the bit/cutter life, speeds up drilling and reduces drilling costs. Regrinding should be undertaken when the wear of the buttons is optimally one third to a maximum of one-half the button diameter.

Manufacturers have developed a range of different manual and semi-automatic grinding apparatus including hand held grinders, single arm and double arm grinding machines and grinders designed specifically for mounting on drill rigs, service vehicles or set up in the shop.

These types of machines utilize a grinding machine having a spindle or rotor rotated at high speed. A grinding cup or grinding pin, mounted on the end of the rotor or spindle, grinds the button and typically the face of the bit/cutter surrounding the base of the button to restore the button to substantially its original profile for effective drilling. In addition to the rotation of the grinding cup, these types of grinding machines may include features where the grinding machine is mounted at an angle to the longitudinal axis of the button and the grinding machine is rotated to provide orbital motion with the center of rotation lying in the center of the grinding cup. When grinding the buttons, the centering aspects of the grinding machine tend to center the grinding machine over the highest point on the button.

Longstanding problems with these types of grinding machines are vibration and noise due to high rotational speeds, wear, the requirement for large compressors for pneumatic systems and long grinding times per button, in the larger sizes.

The grinding cups conventionally consist of a cylindrical body having top and bottom surfaces. The bottom or working surface consists of a diamond/metal matrix having a centrally disposed recess having the desired profile for the button to be ground. The rim around the recess may be adapted, for example by beveling, to remove steel from the face of the bit around the base of the button.

Water and/or air, optionally with some form of cutting oil, is provided to the grinding surface to flush and cool the surface of the button during grinding.

The grinding cups are provided in different sizes and profiles to match the standard sizes and profiles of the buttons on the drill bits or cutters. Typically the button diameter varies from 6 mm up to 26 mm.

Several different methods have been used to connect and retain the grinding cups on to the grinding machine. The grinding cups were conventionally held in the grinding machine by inserting an upright hollow stem projecting from the top surface of the grinding cup into a chuck for detachable mounting. Special tools such as chuck wrenches, nuts and collets are necessary to insert, hold and to remove the grinding cup into and out of the chuck.

To eliminate the need for chuck wrenches etc. the use of a shoulder drive on the grinding cups was developed. A diametrically extending recess at the free end of a hollow drive shaft of the grinding machine co-operates with a shoulder or cam means on the adjacent top surface of the grinding cup to provide the drive means. The stem of the grinding cup, in order to provide axially and radial support, is inserted into the hollow drive shaft and maybe held in place by one or more O-rings either located in a groove in the interior wall of the drive shaft or on the stem of the grinding cup. See for example Swedish Patent No. B 460, 584 and U.S. Pat. No. 5,527,206.

An alternative to the shoulder drive is shown, for example, in Canadian Patent 2,136,998. The free end of the stem of the grinding cup is machined to provide flat drive surfaces on the stem that are inserted into a corresponding drive part in the channel of the output drive shaft into which the stem is inserted. The grinding cup is retained in place by a spring biased sleeve which forces balls mounted in the wall of the output drive shaft into an annular groove on the stem of the grinding cup.

Other innovations are illustrated in U.S. Pat. Nos. 5,639, 273 and 5,727,994. In these patents, the upright stem has been replaced with a centrally disposed hexagonal cavity provided in the top surface of the grinding cup. The cavity is shaped and sized to permit the output drive shaft of a grinding machine to be inserted into the cavity. The end of the output drive shaft has an end section having a corresponding hexagonal cross section to fit into the hexagonal cavity to provide the drive means. A second section of the output drive shaft having a circular cross section to fit into the cavity to provide axial and radial support.

Some manufacturers, in order to provide grinding cups that are compatible for use with other manufacturers' grinding machines provide adapters that connect their grinding cup to the output drive shaft of competitors' grinding machines.

Regardless of the method of connecting the grinding cup to the output drive shaft of the grinding machine, it is important to optimize the operational stability of the grinding cup. Lack of operational stability often results in vibration and resonance during grinding. Vibration and/or resonance also directly results in increased rates of wear to all moving parts such as bearings, joints, etc. of the grinding apparatus and can potentially interfere with settings within the operating control circuits of the grinding apparatus. In addition, lack of operational stability results in increased wear to all key drive/contact surfaces of the output drive shaft (rotor) and grinding cup which provide consistent, proper alignment between grinding cup and or adapter and the rotor during operation. Operational instability and associated vibration and/or resonance is a major contributor to the deterioration of the preferred built-in profile of the cavity in the grinding section of the grinding cup. This directly results in deterioration in the profile of the restored button. The net effect being a substantial loss in the intended overall drilling performance of the drill bit or cutter used.

These known drive systems provide means to axially and radially support the grinding cup in the grinding machine and separate drive means for transfer of torsional forces to rotate the grinding cup.

U.S. Pat. No. 7,402,093 addressed a number of problems with earlier machines and provided a grinding machine carried on a support system where the grinding cup is rotated at variable speeds preferably from about 2200 to 6000 RPM and the support system is capable of providing a variable feed pressure preferably or optionally up to 350 kilos. In this type of machine there is a need to control the feed pressure with precision.

SUMMARY OF THE INVENTION

Accordingly the present disclosure provides a grinding cup for detachable connection to the output drive shaft of a grinding machine for grinding buttons on drill bits or cutters having an improved design. The grinding cup is one in a series of grinding cups for grinding different sizes and profiles of buttons on the drill bits. The grinding cup has top and bottom surfaces and consists of a lower grinding section and an upper body section co-axial with the grinding section to form a grinding cup with a centrally disposed recess formed in the bottom surface of the grinding section having the desired profile for the button to be ground. The improvement of the present invention is characterized by the upper body section having a centrally disposed upright drive section sized and shaped to fit within a co-axial recess in a free end of the output drive shaft. The upright drive section has a first support section extending from a top surface of the upper body section and a co-axial drive section on the upright drive section extending from a top surface of the first support section to a free end of the upper drive section. The co-axial drive section has a lower cam portion with an elliptical cross section, shaped and sized to fit within a corresponding pair of lobed grooves in a sidewall of the co-axial recess in the output drive shaft and an upper portion, co-axial with the lower cam portion having a circular cross-section slightly less than the diameter of an upper portion of the co-axial recess in the output drive shaft. Retaining means for detachably connecting the grinding cup to the output drive shaft of the grinding machine are provided on the upright drive section, preferably on or in association with the first support section.

Another embodiment of the present invention consists of a holder device for detachable connection of a grinding cup to a grinding machine, the grinding machine having a pneumatically, hydraulically or electrically driven motor which drives an output shaft. Suitably connected to the output shaft by any conventional means is a holder device of the present invention. The holder device may be an integral extension of the output shaft or a separate attachment. The holder device consists of a rotatable drive member having a free end adapted to extend axially away from the grinding machine. The rotatable drive member is provided with a an axial recess at its free end with a coaxial passageway extending from the recess the length of the drive member or part thereof and through which coolant fluid may be directed to a grinding cup supported thereon. The recess is adapted to accommodate a corresponding sized and shaped upright drive section on a grinding cup. The recess preferably has a support section extending from the free end of the rotatable drive member. Adjacent the support section are a series of lobed grooves that are machined into the interior wall of the recess. A pair of opposite lobed grooves are sized to match an cam portion on the upper drive section of a grinding cup. Adjacent to the series of annular grooves is a second support section. This design permits the upright drive section of the grinding cup to be inserted easily within the recess without the necessity of specific alignment of the rotatable drive member and grinding cup. The grinding cup can simply be pushed on the rotatable drive member and can be rotated so the elliptical cam section fits within a pair of lobed grooves.

When the grinding cup is positioned in the recess, the rotatable drive member will rotate the grinding cup without slipping when in use.

According to another embodiment the present disclosure provides a grinding cup for detachable connection to the output drive shaft of a grinding machine for grinding buttons on drill bits or cutters. The grinding cup is one in a series of grinding cups for grinding different sizes and profiles of buttons on the drill bits. The grinding cup has top and bottom surfaces and consists of a lower grinding section and an upper body section co-axial with the grinding section to form a grinding cup with a centrally disposed recess formed in the bottom surface of the grinding section having the desired profile for the button to be ground. The improvement of the present invention is characterized by the upper body section having a centrally disposed upright drive section sized and shaped to fit within a co-axial recess in a free end of the output drive shaft. The upright drive section has co-axial drive section wherein the co-axial drive section is manufactured from a material different from the output drive shaft and selected so that wear occurs on the co-axial drive section rather than the output drive shaft.

According to another embodiment the present disclosure provides a grinding cup for detachable connection to the output drive shaft of a grinding machine for grinding buttons on drill bits or cutters. The grinding cup is one in a series of grinding cups for grinding different sizes and profiles of buttons on the drill bits. The grinding cup has top and bottom surfaces and consists of a lower grinding section and an upper body section co-axial with the grinding section to form a grinding cup with a centrally disposed recess formed in the bottom surface of the grinding section having the desired profile for the button to be ground. The improvement of the present invention is characterized by the grinding cup being provided with identification means that can exchange data with a control system on the grinding apparatus. The data preferably includes a specific ID identifier for the particular grinding cup and the number of grinding cycles over which it has been used to date. The ID identifier data includes the grinding cup size and grinding surface profile. In a preferred embodiment the identification means is an RFID tag.

Further features of the invention will be described or will become apparent in the course of the following detailed description.

BRIEF DESCRIPTION OF THE DRAWINGS

In order that the disclosure may be more clearly understood, embodiments will now be described in detail by way of example, with reference to the accompanying drawings, in which.

DETAILED DESCRIPTION

Figure 1:
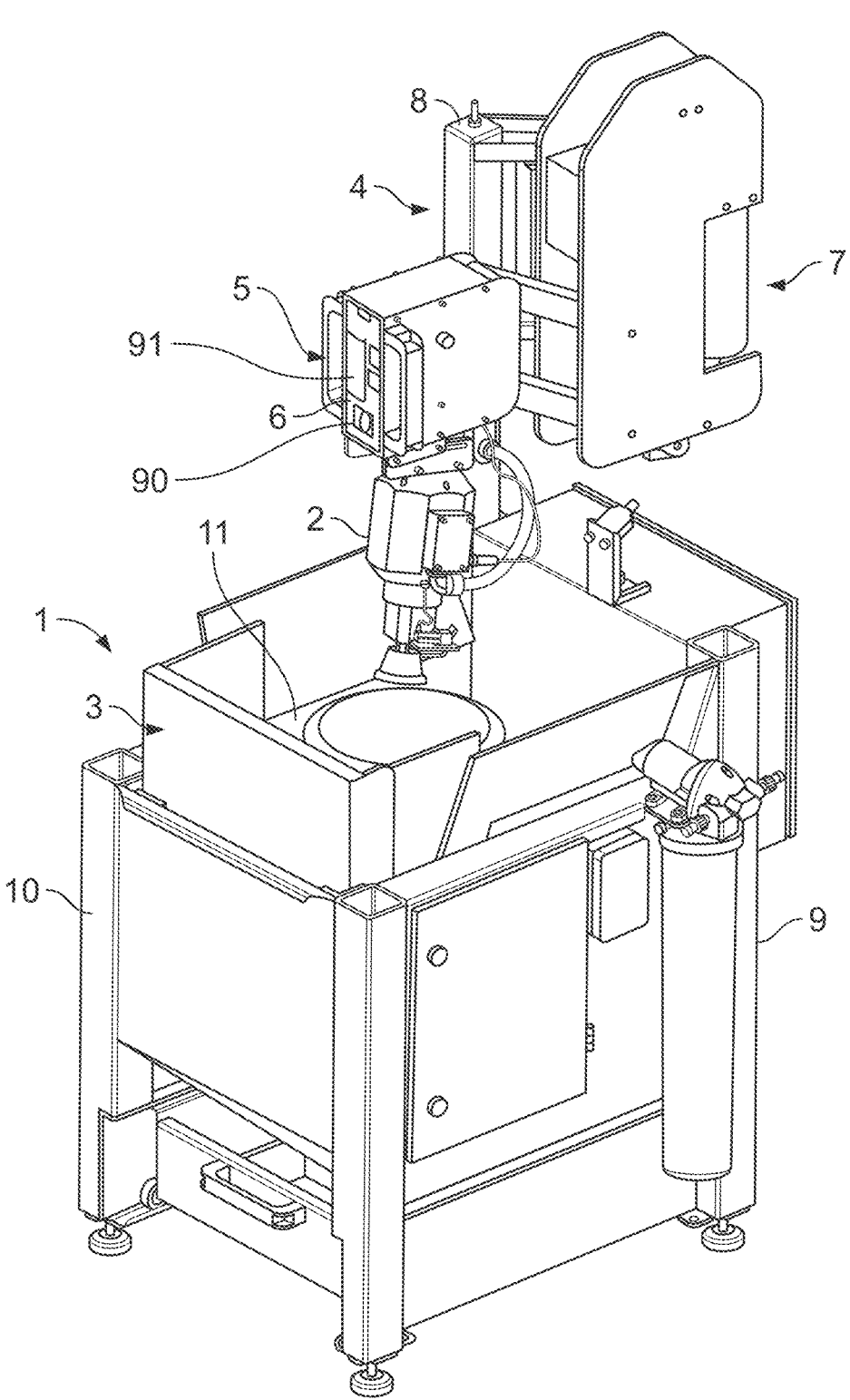
FIG. 1 is perspective view from the right side of one embodiment of a grinding apparatus having a grinding machine carried for vertical and horizontal adjustment by a support system, and means for holding the bit(s) to be ground.

With reference to the FIG. 1 an embodiment of a grinding apparatus, generally indicated at 1, having a grinding machine for grinding the hard metal inserts or working tips of rock drill bits (percussive or rotary), tunnel boring machine cutters (TBM) and raised bore machine cutters (RBM) and more specifically, but not exclusively, for grinding the cutting teeth or buttons of a rock drill bit or cutter is illustrated. The grinding apparatus 1 includes a grinding machine 2, means for holding one or more bits to be ground generally indicated at 3 and a support system generally indicated at 4. The grinding machine 2, means for holding the bits 3 and support system 4 are arranged to permit relative movement between the grinding machine 2 and the bit to be ground to permit alignment of the grinding machine 2 with the longitudinal axis of the buttons on the bit. The grinding apparatus 1 has a control system, part of which is generally indicated at 5, having a programmable operator control panel 6 capable of directly or indirectly monitoring and adjusting one or more operational parameters. The operational parameters may include feed pressure, grinding cup RPM, grinding time and other parameters as noted herein.

In the grinding apparatus 1 shown in FIG. 1, the grinding machine 2 is carried by support system 4 which includes an arm or lever system 7 journaled on a stand 8 attached to the rear 9 of an open box 10. The bit holder means 3 consists of a table 11 mounted within the box 10.

Figure 2:
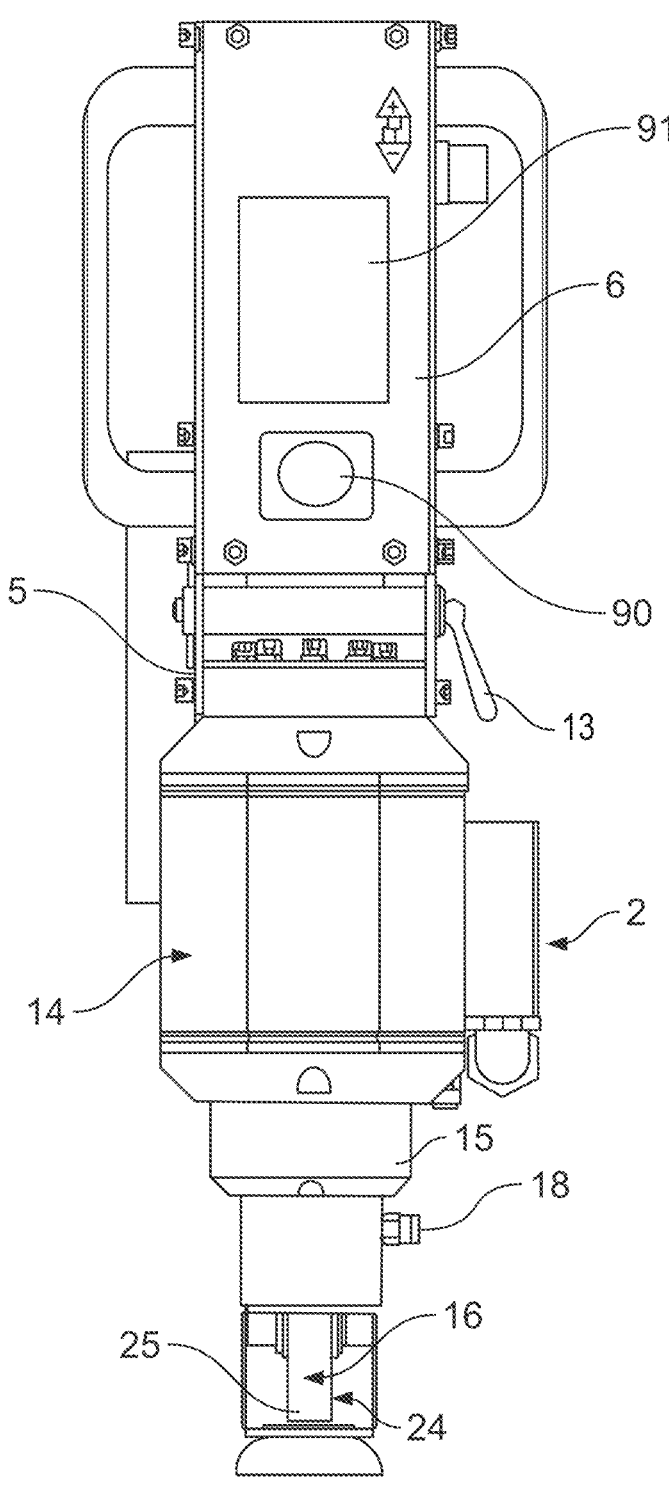
FIG. 2 is an enlarged view of a grinding machine of FIG. 1 having a spindle assembly including an output drive shaft according to the present disclosure.

In FIG. 2, an embodiment of a grinding machine 2 suitable for use with the grinding apparatus 1 of FIG. 1. FIG. 2 shows the grinding machine 2 attached to plates below a control box 12. The grinding machine 2 is locked in place by levers 13. A water-cooled electric motor, generally indicated at 14, has an exterior housing defining a chamber in which the rotor and stator are located. A drive coupling at the bottom of the housing permits attachment of the spindle assembly 15. The drive coupling is inserted into the mating drive coupling 20 on spindle assembly 15 (see FIG. 4). The spindle assembly 15 has an output drive shaft 16 to which a grinding cup can be connected. The spindle assembly 15 is attached to the electric motor housing 14 by bolts 17. As shown in FIG. 2 coolant water for delivery to the grinding cup surface is provided though connection 18. The electric motor 14 is preferably a three-phase motor. The motor can be hydraulic, electric or the like without departing from the substance of the present invention. The dimensions of the casing are such that the grinding machine may be handled manually if desired. For the latter purpose, the casing is provided with handles projecting diametrically oppositely outwardly from the casing. Suitably connected to the output drive shaft 16 by any conventional means is a holder device 24. In the illustrated embodiment the holder device 24 is an integral extension of the shaft 16 which constitutes a rotatable elongate drive member 25. The shaft 16 and drive member 25 are provided with a coaxial passageway 26 extending along the length or part thereof and through which coolant/flushing fluid may be directed to a grinding cup supported thereon.

Figure 3:
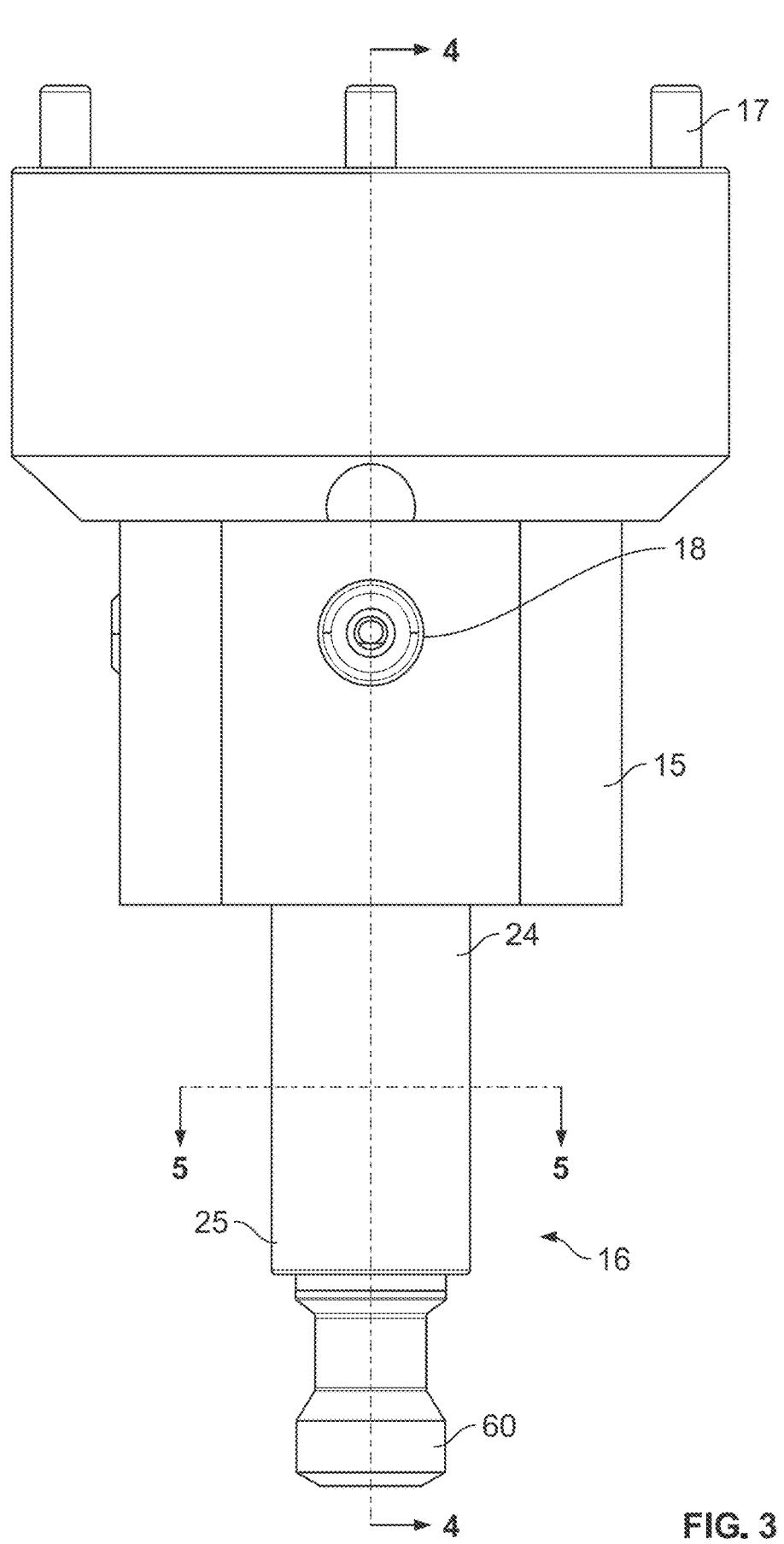
FIG. 3 is an enlarged plan view of the spindle assembly of FIG. 2 for grinding machine having an output drive shave in the form of a rotatable drive section with a connected grinding cup in accordance with the present invention.
Figure 4:
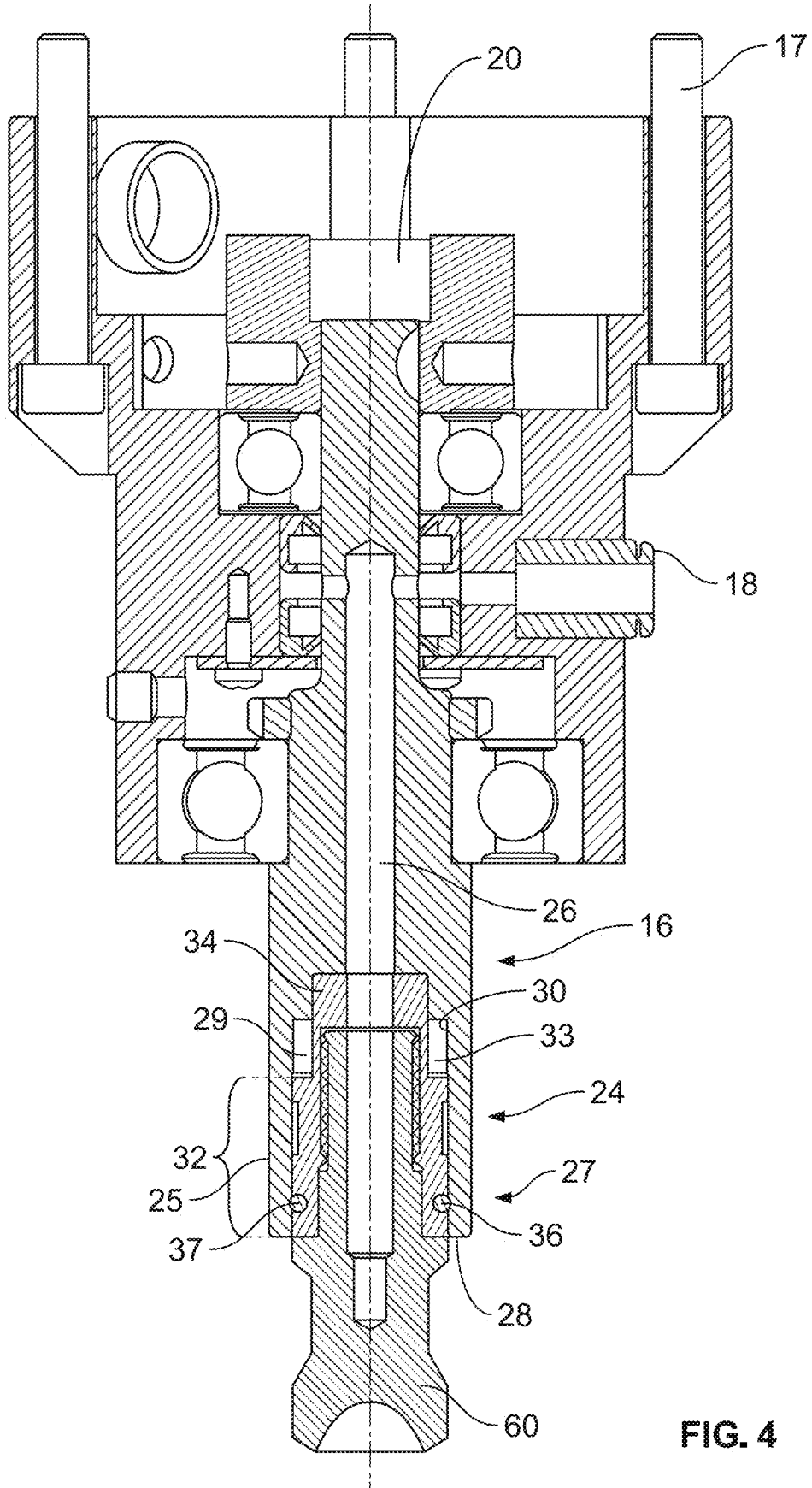
FIG. 4 is cross-section view of the spindle assembly connected grinding cup of FIG. 3 along line 4-4.
Figure 5:
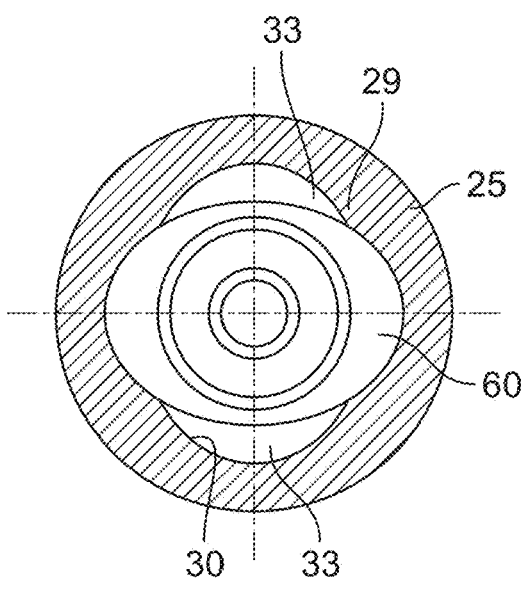
FIG. 5 is a cross-section view of the rotatable drive member shown in FIG. 3 along line 5-5.
Figure 6:
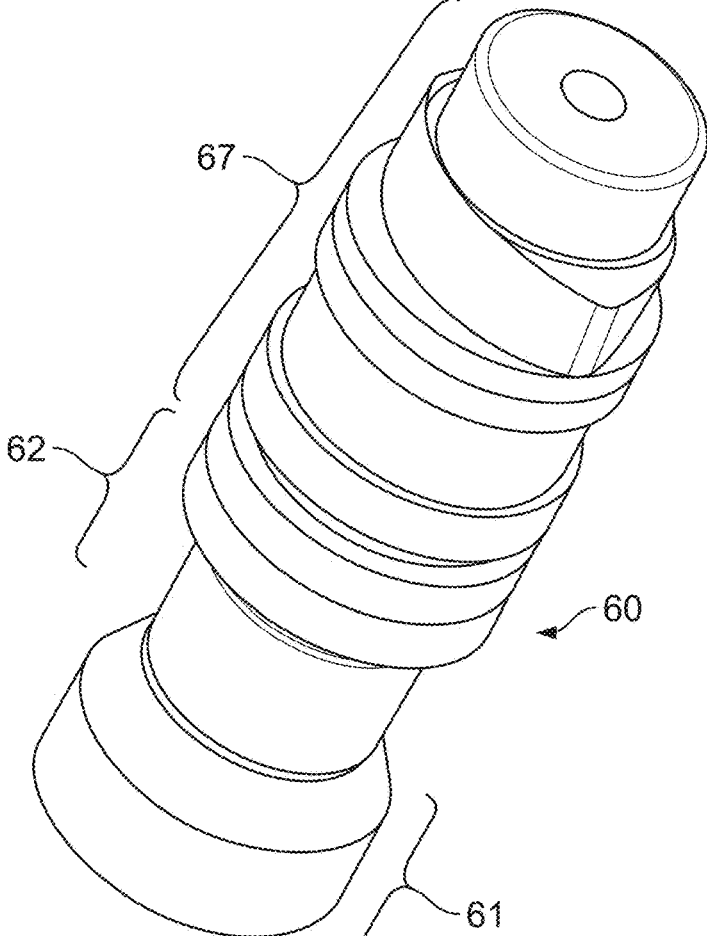
FIG. 6 is a perspective view of one embodiment of a grinding cup in accordance with the present invention.
Figure 7:
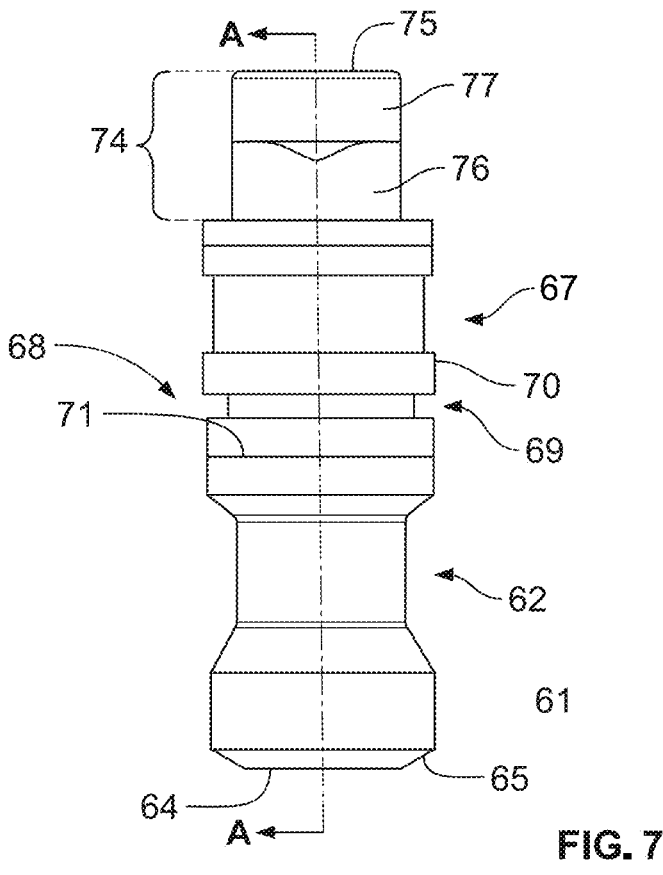
FIG. 7 is a front plan view of the grinding cup of FIG. 6.
Figure 8:
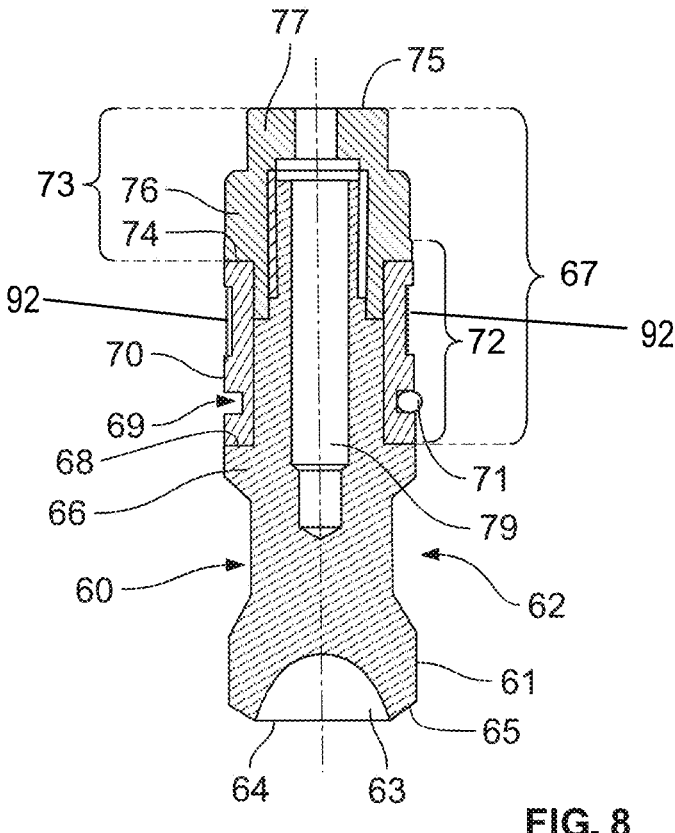
FIG. 8 is a partial cross-section of the grinding cup of FIG. 7 along line A-A.
Figure 9:
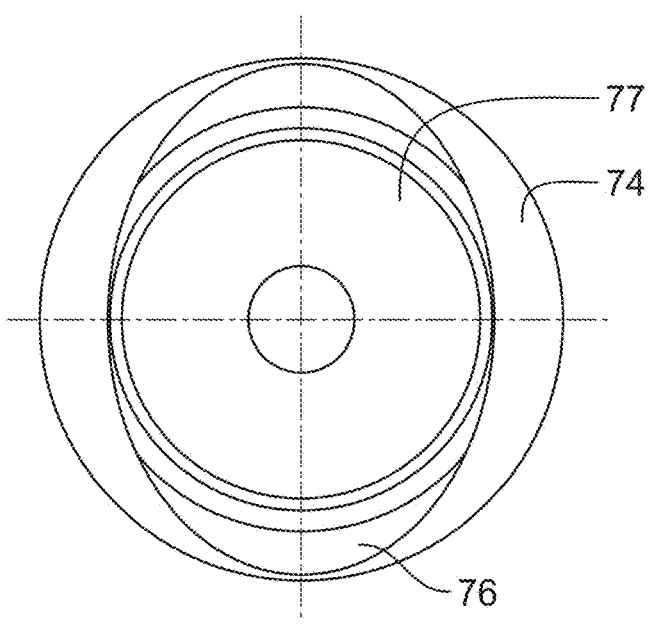
FIG. 9 is a top plan view of the grinding cup of FIG. 7.

With reference to the FIGS. 3-5 one embodiment of a spindle assembly, generally indicated at 15, for a grinding machine for grinding the hard metal inserts or working tips of rock drill bits (percussive or rotary), tunnel boring machine cutters (TBM) and raised bore machine cutters (RBM) and more specifically, but not exclusively, for grinding the cutting teeth or buttons of a rock drill bit or cutter is illustrated. The spindle assembly 15 can be used with a range of different manual and semi-automatic grinding machines including hand held grinders, single arm and double arm grinding machines and grinders designed specifically for mounting on drill rigs, service vehicles or set up in the shop. The spindle assembly 15 has an output drive shaft 16 with, in the embodiment illustrated, a detachable grinding cup 60 is connected.

The spindle assembly 15 is intended to be driveably connected to the motor of a grinding machine (not shown). The spindle assembly 15 is attached to the motor housing by bolts 17. A drive coupling at the bottom of the motor housing permits attachment of a mating drive coupling 20 on the spindle assembly 15. The spindle assembly 15 has an output drive shaft 16 to which a grinding cup 60 can be detachably connected. Coolant water for delivery to the grinding cup surface is provided though connection 18. Suitably connected to the output drive shaft 16 by any conventional means is a holder device 24. In the illustrated embodiment, the holder device 24 is an integral extension of the shaft 16 which constitutes a rotatable elongate drive member 25. The shaft 16 and drive member 25 are provided with a coaxial passageway 26 extending along the length or part thereof and through which coolant/flushing fluid may be directed to a grinding cup 60 supported thereon, the grinding cup being shown in FIGS. 6-13 and described in detail below. An end portion 27 of the elongate drive member 25, extending from its free end 28, is provided with a centrally disposed recess 29 co-axial with passageway 26, adapted to accommodate a corresponding sized and shaped upright drive section on grinding cup 60 (see FIGS. 6-13).

As shown in FIGS. 4 & 5, the interior wall 30 of the recess 29 in drive member 25 is machined to allow the grinding cup 60 to driveably engage within the recess 29. In the embodiment illustrated recess 29 has a support section 32 extending from the free end 28 and co-axial with passageway 26. Adjacent the support section 32 a series of lobed grooves 33 that are machined into interior wall 30. A pair of opposite lobed grooves 33 are sized to match an elliptical portion of the drive section on the grinding cup 60. Adjacent to the series of annular grooves 33 is a second support section 34 in recess 29. This design permits the upright drive section of grinding cup 60 to be inserted easily within recess 29 without the necessity of specific alignment of the drive member and grinding cup. The grinding cup can simply be pushed on the drive member 25 and can be rotated so the elliptical drive section fits within a pair of lobed grooves 33. When the grinding cup 60 is positioned in recess 29, the drive member 25 will rotate the grinding cup without slipping when in use. Further the present disclosure maximizes the contact surfaces between the upright drive section on grinding cup 60 and the interior wall 30 of recess 29 on drive member 25. This reduces the wear to all key drive/contact surfaces of the output drive shaft (rotor) and grinding cup which provide consistent, proper alignment between grinding cup and or adapter and the rotor during operation.

Retaining means may be provided in recess 29 of drive member 25 to detachably retain the grinding cup 60 so that grinding cup 60 will not fly off during use but can still be easily removed or changed after use. The retaining means may include one or more annular grooves 36 in the interior wall 30 within the support section 32 of recess 29 in drive member 25. O-rings or expansion rings 37 may be inserted into the grooves.

FIGS. 6-9 illustrate one embodiment of a grinding cup 60 for detachable connection to the output drive shaft 16 of a grinding machine for grinding buttons on drill bits or cutters according to the present invention. The grinding cup 60 consists of a lower grinding section generally indicated at 61 and an upper body section 62 co-axial with said grinding section 61 to form said grinding cup 60. A centrally disposed recess 63 is formed in the bottom surface 64 of the grinding section 61 having the desired profile for the button to be ground.

The bottom (grinding) surface 64 and the surface of the centrally disposed recess 63 formed in the bottom surface 64 of the grinding section 61 are formed from a material capable of grinding the tungsten carbide button bits. In the embodiment illustrated, the grinding surface is formed from a metal and diamond matrix. The peripheral edge 65 in the bottom surface 64 is beveled to facilitate the removal of steel from the face of the bit around the base of the button during grinding.

The upper body section 62 has an upper base 66 having a centrally disposed upright drive section 67 formed on the top surface 68 of the base 66. The drive section 67 is shaped and sized to driveably engage within the corresponding recess 29 at the free end 28 of the output drive shaft 16 of said grinding machine. Retaining means, generally indicated at 69, for detachably connecting the grinding cup to the output drive shaft of the grinding machine are provided on the upright drive section 67. In the embodiment illustrated the retaining means comprises an annular groove 69 in the outer surface 70 of the upright drive section 67 sized and shaped to retain an O-ring 71.

In the embodiment illustrated, the upright drive section 67 has a first support section 72 connected to the top surface 68 of upper base 66 and having a circular cross section. A co-axial drive section 73 on the upright drive section 67 extends from a top surface 74 of the first support section 72 to a free end 75 of the drive section 67. The co-axial drive section 73 has a lower portion 76 in the form of a cam having an elliptical cross section, shaped and sized to fit within a corresponding pair of lobed grooves 33 (see FIG. 4) in sidewall 30 of the recess 29 in the output drive shaft 16. An upper portion 77, co-axial with lower portion 76, has a circular cross-section slightly less than the diameter of an upper portion 78 of the recess 29 in the output drive shaft 16.

A passageway 79 is provided through the upright drive section 67 and upper body section 62. The passageway 79 is co-axial with the upright drive section 67 and upper body section 62 and communicates with one or more openings (not shown) on the grinding surface 64 through which coolant/flushing fluid may be directed to the surface of the button being ground during grinding.

In the embodiment illustrated in FIGS. 10-13, the first support section 72 of the upright drive section 67 is connected to the top surface 68 of upper base 66. The first support section 72 has a first cylindrical section 85 extending from the top surface 68 of upper base 66. A coaxial threaded section 86 extends from a top surface 85A of the first cylindrical section 85.

A co-axial drive section 73 on the upright drive section 67 extends from a top surface 74 of the first support section 72 to a free end 75 of the drive section 67. The co-axial drive section 73, in the embodiment illustrated, is machined from a metal such as bronze, brass and has a lower portion 76 in the form of a cam having an elliptical cross section. An upper portion 77, co-axial with lower portion 76, has a circular cross-section slightly less than the diameter of an upper portion of the recess 29 in the output drive shaft 16. A threaded passageway 78 in the co-axial drive section allows it to be connected to the coaxial threaded section 86 extends from a top surface 85A of the first cylindrical section 85.

Figure 10:
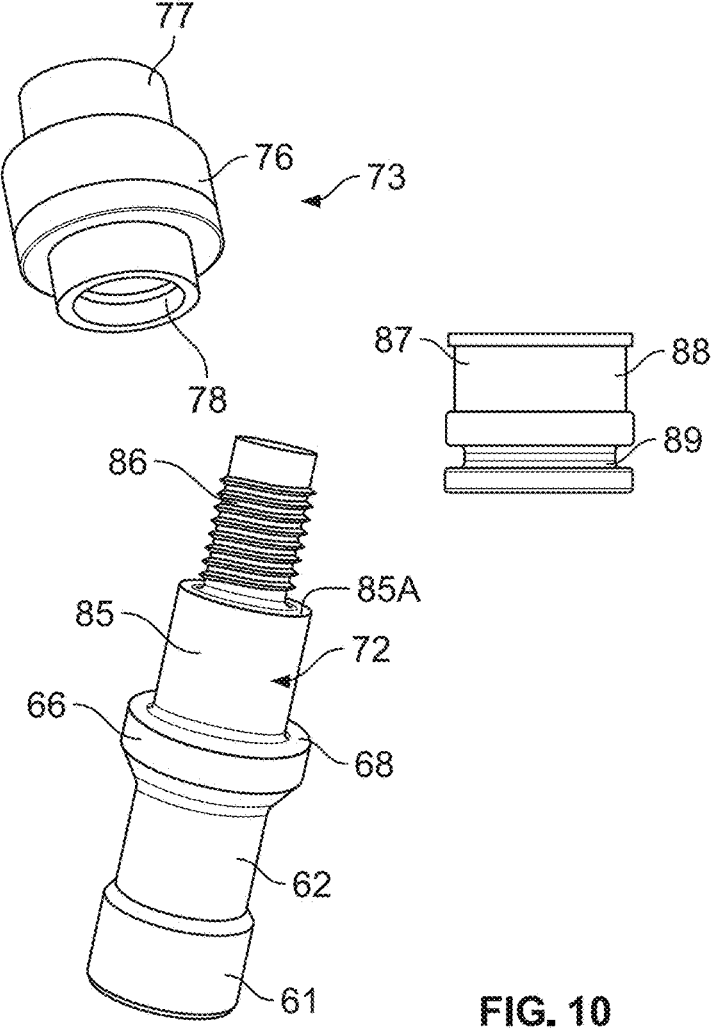
FIG. 10 is photograph of the component parts of another embodiment of a grinding cup according to the present invention.

In the embodiment illustrated in FIG. 10, before connecting the co-axial drive section 73 and the first cylindrical section 85 of the first support section 72 of the upright drive section 67 a plastic sleeve 87 is pressed down around the first cylindrical section 85. The plastic sleeve 87 has a first annular indent 88 sized and shaped to accommodate an RFID tag 92 (shown in FIG. 8). The RFID tag 92 can exchange data with a reader located in control box 5 on the grinding apparatus 2. A second annular groove 89 is provided on plastic sleeve 87 as part of the retaining means 68 for detachably connecting the grinding cup to the output drive shaft of the grinding machine. In the embodiment illustrated the retaining means includes an O-ring 71 that is retained with the second annular groove 89 provided on plastic sleeve 87.

In the embodiment illustrated, grinding cup 60 is one in a series of grinding cups for grinding the working tips or buttons of rock drill bits wherein the working tips or buttons have a diameter of about 6 mm to 26 mm and a desired profile.

In the embodiment illustrated, both the grinding cup 60 and drive member 25 can be fabricated from stainless steel to prevent corrosion and to facilitate clean up after grinding. As noted above the co-axial drive section 73 can be manufactured from a material different from the drive member 25 so that wear occurs more likely on the co-axial drive section 73 rather than dive member 25. The sleeve 87 that retains an RFID tag needs shield the RFID tag from the surrounding metal on the grinding cup 60 so is formed of plastic or other suitable non-metallic material.

FIG. 10 illustrates the component parts of the embodiment of a grinding cup according the present invention. In the embodiment illustrated the grinding cup 60 has a grinding section 61 connected to an upper body section 62. The upper body section 62 has an upper base 66 having a centrally disposed upright support section 67 formed on the top surface 68 of the base 66. The upright support section 67 has a first support section 72 connected to the top surface 68 of upper base 66 and having a circular cross section. A threaded stem 86 extends from the top of the first support section 72.

A co-axial drive component 74 is illustrated and has a lower portion 76 in the form of a cam having an elliptical cross section, shaped and sized to fit within a corresponding pair of lobed grooves 33 (see FIG. 4) in sidewall 30 of the recess 29 in the output drive shaft 16. An upper portion 77, co-axial with lower portion 76, has a circular cross-section slightly less than the diameter of an upper portion of the recess 29 in the output drive shaft 16.

The third component illustrated is a plastic sleeve 87 sized and adapted to be pressed down around the centrally disposed upright support section 85 formed on the top surface 68 of the upper body section 62. The plastic sleeve 87 has a first annular indent 88 sized and shaped to accommodate an RFID tag 92. The RFID tag 92 can exchange data with a reader located in control box on the grinding apparatus 2. A second annular groove 89 is provided on plastic sleeve 87 as part of the retaining means 69 for detachably connecting the grinding cup to the output drive shaft of the grinding machine.

Once the plastic sleeve 87 pressed down around the centrally disposed upright support section 85, the co-axial drive component 73 is screwed on to threaded stem 86 on the upright support section 67 to form the assembled grinding cup.

Figure 11:
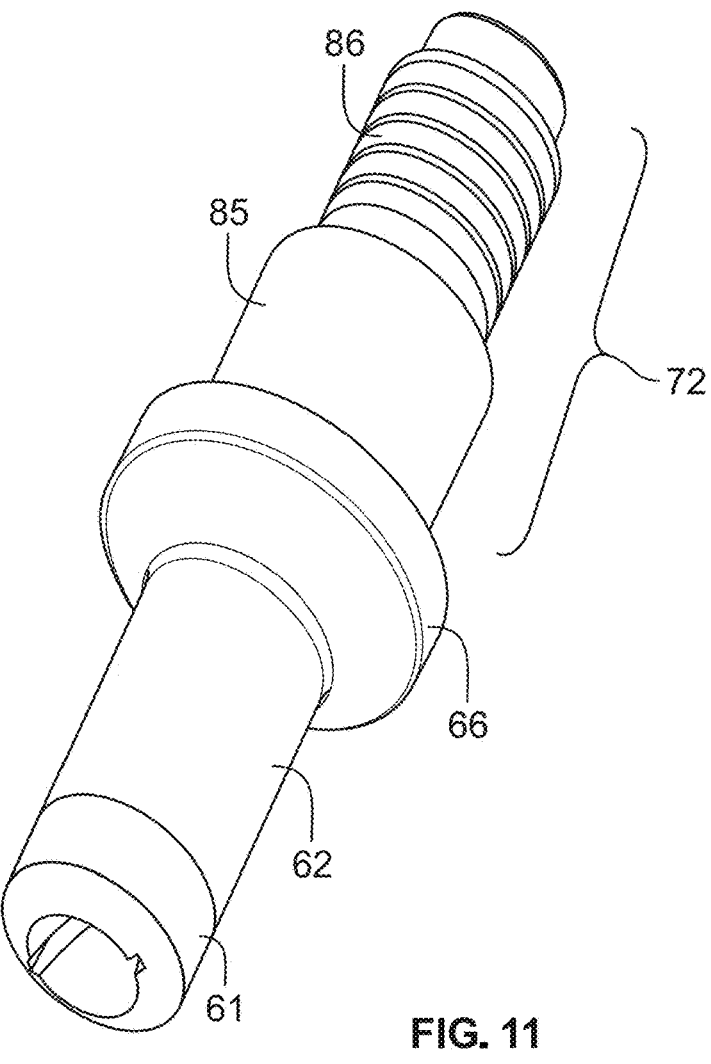
FIG. 11 is a perspective view of another embodiment of the grinding section and upper body section of a grinding cup according to the present invention.

FIG. 11 illustrates upper body section 62 with the grinding section 61 connected. The grinding section 61 is connected to the upper body section 62. The upper body section 62 has an upper base 66 having a centrally disposed upright support section 67 formed on the top surface 68 of the base 66. The upright support section 67 has a first support section 85 connected to the top surface 68 of upper base 66 and having a circular cross section. A threaded stem 86 extends from top of the first support section 85.

Figure 12:
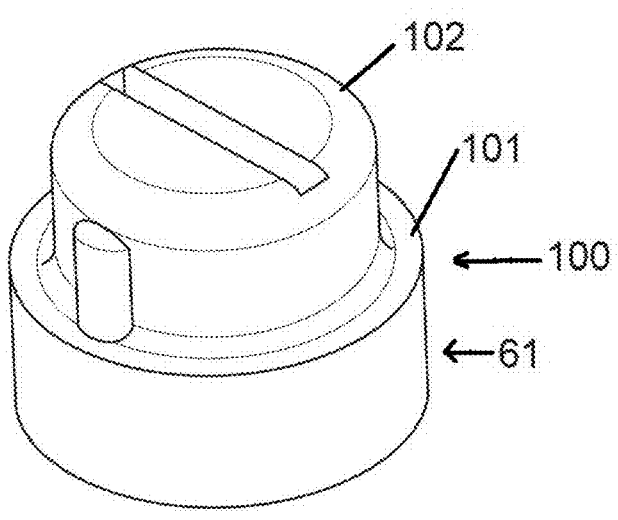
FIG. 12 is a perspective view of the grinding section shown in FIG. 11.
Figure 13:
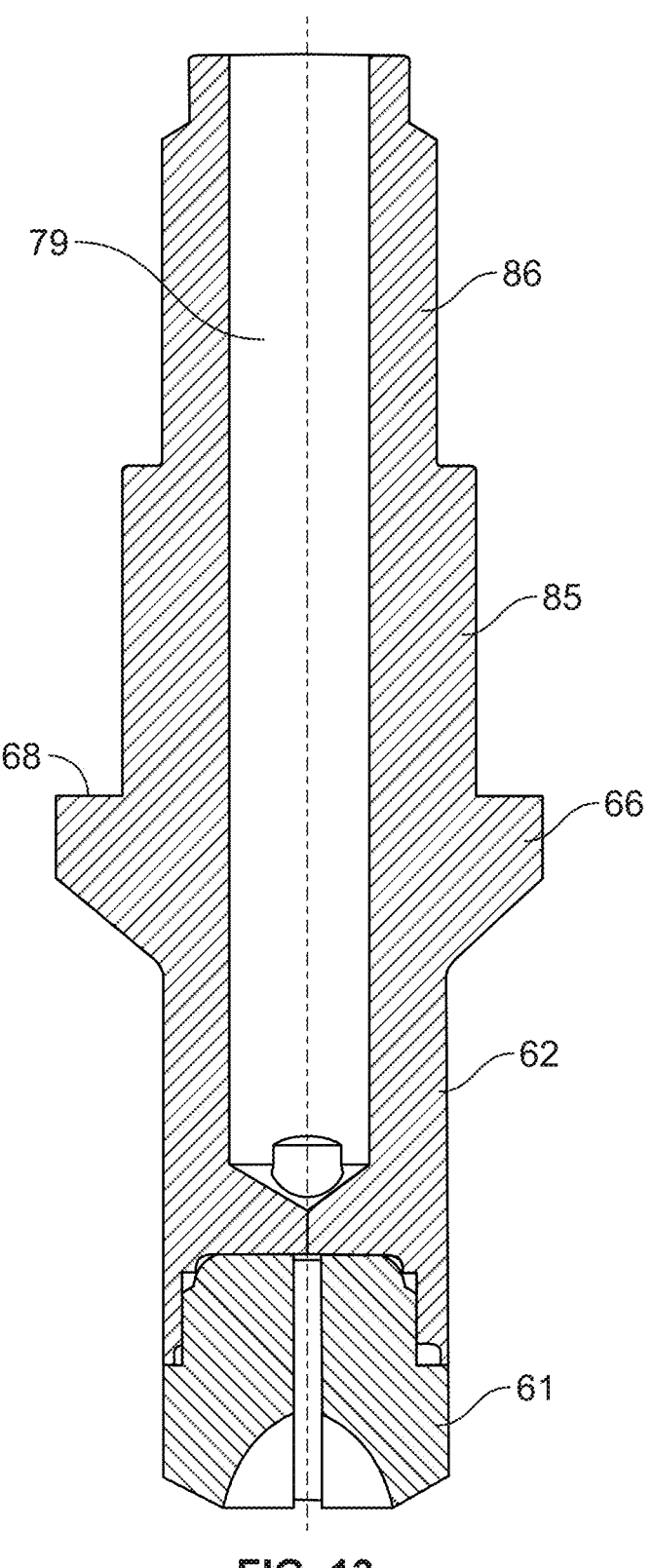
FIG. 13 is a cross-section of the grinding section and upper body section of a grinding cup of FIG. 11.
Figure 14:
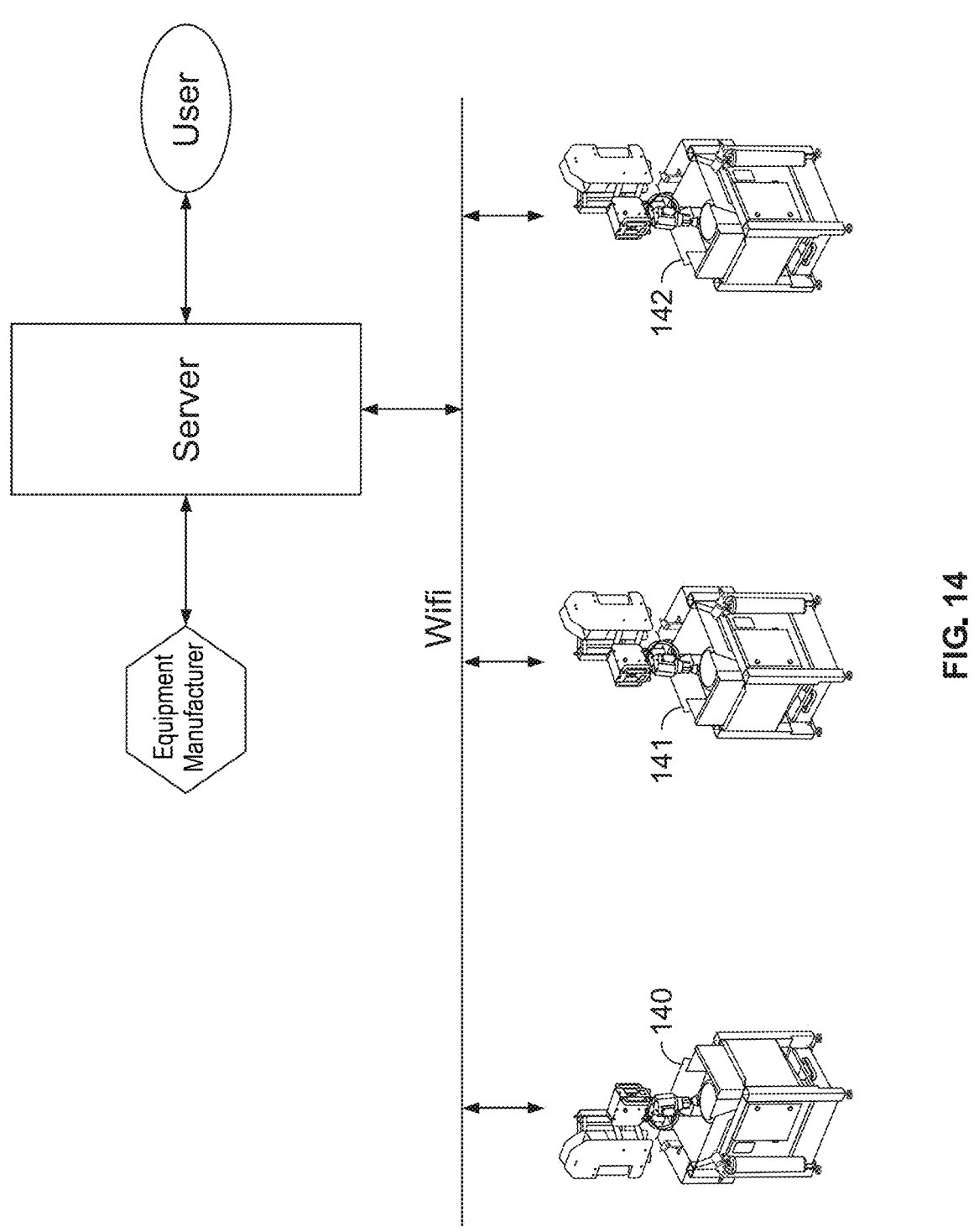
FIG. 14 is a cross-section of the free end of an output drive shaft in the form of a rotatable drive section with another embodiment of a connected grinding cup in accordance with the present invention.

FIG. 12 illustrates the grinding section 61 before assembly onto the upper body section 62. Integral with and adjacent a top surface of the grinding section 61 are means 100 to connect the grinding section 61 to the upper body section 62. The means 100 to connect the grinding section 61 to the upper body section 62 can be formed integrally with the grinding section 61 and machined to the desired configuration or cast separately and attached to the top surface 101 of the grinding section 61. In the embodiment illustrated in FIG. 12, the means 100 to connect the grinding section 61 to the upper body section 62, consists of a generally cylindrical stub 102 centrally located on the top surface 101 of the grinding section 61. The stub 102 is intended to be inserted into a corresponding cavity on the upper body section 62 in a manner (1) that will prevent the grinding section 61 from rotating or spinning free relative to the upper body section 62 and (2) that will support axial, radial, torsion and feed forces associated with the use of the grinding cup. In the preferred embodiment illustrated the stub 102 is press fit into the upper body section 62 and the grinding section 61 TIG welded to the upper body section 62. Alternatively a stub on the upper body section 62 could fit into a corresponding cavity on the lower grinding section. Some examples of other possible connection methods are taper fits, threaded connections, adhesives, solder, friction welding and pins. The stub 102 could have a non-circular cross-section.

As noted above, the grinding apparatus 1 has a control system, part of which is generally indicated at 5, having a programmable operator control panel 6 capable of directly or indirectly monitoring and adjusting one or more operational parameters. A programmable control card is provided attached to rear of operator control panel 6, having a circuit board containing the central processor (ie. microprocessor or microcontroller) for the control system of the grinding apparatus. The central processor can be located anywhere suitable for the application and can be suitably interconnected with other sub-processors to monitor various functions as deemed necessary for proper function. The overall control system includes systems and controls that together with a microprocessor or microcontroller can control all aspects of the grinding apparatus including grinding time on each button, rotational speed of the grinding cup, grinding pressure, bit holder tilt function, operating lights and coolant flow. The microprocessor or microcontroller and the control system can be used to provide other functions either manual or automatic. For example, the microprocessor or microcontroller and control system, in the case of an electric motor, can monitor the amperage being used and/or the temperature and if it reaches a preset limit automatically decrease the grinding pressure to prevent motor burn out. The microprocessor or microcontroller and control system can also control the flow of coolant to the face of the button during grinding.

In addition, the control panel software can be configured such that the user could select for example whether long grinding cup life or high material removal rate of the grinding cup is preferred.

When using a grinding cup of the type illustrated in FIGS. 6-13, an RFID reader 90 is provided within operator control panel 6 together with a touch screen display 91. When the free end 75 of a grinding cup 60 equipped with an RFID tag 92 in accordance with present invention is inserted into the RFID reader 90 a proximity sensor detects the RFID tag 92 and scans the data on the tag. The data preferably includes a specific ID identifier for the particular grinding cup 60 and the number of grinding cycles over which it has been used to date. The ID identifier data includes the grinding cup size and grinding surface profile. Once the RFID tag 92 has been scanned the data is transmitted to the programmable microprocessor and the grinder size and profile can be displayed on the touch screen.

Having illustrated and described a preferred embodiment of the invention and certain possible modifications thereto, it should be apparent to those of ordinary skill in the art that the invention permits of further modification in arrangement and detail and is not restricted to the specific semi-automatic grinding apparatus illustrated.

It will be appreciated that the above description related to the preferred embodiment by way of example only. Many variations on the invention will be obvious to those knowledgeable in the field, and such obvious variations are within the scope of the invention as described and claimed, whether or not expressly described.

The embodiments of the invention in which an exclusive property or privilege is claimed are defined as follows:

1. A grinding cup for detachable connection to an output drive shaft of a grinding machine for grinding buttons on drill bits or cutters, the grinding cup comprising:

a top surface and a bottom surface;

a lower grinding section and an upper body section co-axial with the lower grinding section to form the grinding cup with a centrally disposed recess formed in the bottom surface of the lower grinding section, the upper body section having an upper base;

a centrally disposed upright support section extending from a top surface of the upper base and sized and shaped to fit within a co-axial recess in a free end of the output drive shaft, the centrally disposed upright support section having a first support section extending from the top surface of the upper base and a co-axial drive component extending from the first support section;

the first support section having a first cylindrical section with a circular cross-section extending from the top surface of the upper base and a stem extends extending from a top of the first cylindrical section;

the co-axial drive component connected to the stem and extending from an upper surface of the first cylindrical section of the first support section of the centrally disposed upright support section to a free end of the co-axial drive component, the co-axial drive component comprising:

a lower cam portion having a non-circular, curved cross-section and shaped and sized to fit within lobed grooves in a sidewall of the co-axial recess in the output drive shaft; and an upper portion coaxial with the lower cam portion and having a circular cross-section, the upper portion sized and shaped to fit within the co-axial recess in the output drive shaft; and retaining means for detachably connecting the grinding cup to the output drive shaft of the grinding machine, the retaining means positioned along the centrally disposed upright support section below the lower cam portion, wherein the upper portion of the coaxial drive component provides radial support for the grinding cup above the lower cam portion when positioned within the output drive shaft, and the retaining means provides radial support for the grinding cup below the lower cam portion when positioned within the output drive shaft.

2. The grinding cup according to claim 1, wherein the grinding cup is provided with information that can be transmitted to a control system on the grinding machine, and the information includes a specific ID identifier for the grinding cup and a number of grinding cycles over which the grinding cup has been used.

3. The grinding cup according to claim 2, wherein the specific ID identifier includes a size of the grinding cup and a grinding surface profile of the grinding cup.

4. The grinding cup according to claim 1, wherein the grinding cup is provided with an RFID tag including identification information of the grinding cup that can be transmitted to a control system on the grinding machine.

5. The grinding cup according to claim 1, further comprising a plastic sleeve press-fitted around the first cylindrical section of the centrally disposed upright support section to provide radial support for the grinding cup within the output drive shaft below the lower cam portion.

6. The grinding cup according to claim 1, wherein the plastic sleeve has a first annular indent sized and shaped to accommodate an RFID tag.

7. The grinding cup according to claim 6, wherein the plastic sleeve has an annular groove sized and shaped to receive the retaining means for detachably connecting the grinding cup to the output drive shaft of the grinding machine.

8. The grinding cup according to claim 1, wherein the lower cam portion has an elliptical cross section.

9. The grinding cup according to claim 1, wherein the co-axial drive component is made of a material comprising a metal component and is different from a material of the output drive shaft and selected so that wear occurs on the co-axial drive component rather than the output drive shaft.

10. The grinding cup according to claim 1, wherein the grinding cup is selected for grinding a particular size and profile of buttons on the drill bits.

11. The grinding cup according to claim 1, wherein the stem that extends from the top of the first cylindrical section of the first support section is a threaded stem, and the is threaded on to the threaded stem.

12. The grinding cup according to claim 1, wherein the co-axial drive component is manufactured so that wear during grinding occurs on the centrally disposed upright support section rather than the output drive shaft of the grinding machine.

13. A grinding cup for detachable connection to an output drive shaft of a grinding machine for grinding buttons on drill bits or cutters, the grinding cup comprising:

a lower grinding section and an upper body section co-axial with the lower grinding section to form the grinding cup with a centrally disposed recess formed in the bottom surface of the lower grinding section, the upper body section having an upper base;

a centrally disposed upright support section extending from a top surface of the upper base and sized and shaped to fit within a co-axial recess in a free end of the output drive shaft, the centrally disposed upright support section having a first support section extending from the top surface of the upper base and a co-axial drive component extending from the first support section;

the first support section having a first cylindrical section with a circular cross-section extending from the top surface of the upper base and a stem extending from a top of the first cylindrical section;

a plastic sleeve press-fitted around a first cylindrical section of the centrally disposed upright support section the plastic sleeve having an annular groove;

the co-axial drive component comprising:

a lower cam portion shaped and sized to fit within lobed grooves in a sidewall of the co-axial recess in the output drive shaft; and an upper portion coaxial with the lower cam portion and sized and shaped to fit within the co-axial recess in the output drive shaft; and retaining means positioned within the annular groove for detachably connecting the grinding cup to the output drive shaft of the grinding machine, wherein the upper portion of the coaxial drive component provides radial support for the grinding cup above the lower cam portion when positioned within the output drive shaft, and the retaining means provides radial support for the grinding cup below the lower cam portion when positioned within the output drive shaft.

14. The grinding cup according to claim 1, wherein the retaining means is an o-ring.

15. A holder system for a grinding machine having a motor which drives an output drive shaft, comprising:

a grinding cup comprising:

a lower grinding section;

an upper base coaxial with the lower grinding section;

a centrally disposed upright support section extending from a top surface of the upper base and sized and shaped to fit within a co-axial recess in a free end of the output drive shaft, the centrally disposed upright support section having a first support section extending from the top surface of the upper base and a co-axial drive component extending from the first support section;

the first support section having a first cylindrical section with a circular cross-section extending from the top surface of the upper base and a stem extends from a top of the first cylindrical section;

the co-axial drive component connected to the stem and extending from an upper surface of the first cylindrical section of the first support section of the centrally disposed upright support section to a free end of the co-axial drive component, the coaxial drive component comprising:

a lower cam portion having a non-circular, curved cross-section shaped and sized to fit within the co-axial recess in the output drive shaft; and an upper portion coaxial with and positioned above the lower cam portion and having a circular cross-section, the upper portion sized and shaped to fit within the co-axial recess in the output drive shaft; and retaining means for detachably connecting the grinding cup to the output drive shaft of the grinding machine, the retaining means positioned below along the centrally disposed upright support section below the lower cam portion; and a holder device for detachably connecting the grinding cup to the grinding machine comprising:

a rotatable drive member having a free end adapted to extend axially away from the grinding machine, the rotatable drive member being provided with an axial recess at its free end with a coaxial passageway extending from the axial recess along a length of the rotatable drive member or part thereof and through which coolant fluid may be directed to the grinding cup supported thereon, the axial recess is adapted to receive the upright drive section on the grinding cup, the axial recess having a first support section extending from the free end of the rotatable drive member, and adjacent the first support section are a series of lobed grooves that are machined into an interior wall of the axial recess, the series of lobed grooves having a non-circular cross-section to match the cam portion on the upright drive section of the grinding cup, adjacent to the series of lobed grooves is a second support section in an upper portion of the axial recess.

* * * * *